Patented July 20, 1943

2,324,960

UNITED STATES PATENT OFFICE 2,324,960

PROCESS OF MAKING COPPER POWDER

Clarence R. G. Stewart, La Grange, Ill., assignor to Western Electric Company, Incorporated, New York, N. Y., a corporation of New York No Drawing. Application February 27, 1942, Serial No. 432,704

7 Claims. (Cl. 75—0.5)

This invention relates to a process of making copper powder and more particularly to a process of recovering copper powder from wire mill sludge.

In the manufacture of copper wire, it is customary to draw the wire through progressively smaller sized dies. In order to reduce the friction between the dies and the wire being drawn and to thereby reduce the breakage in the wire, a coolant and a lubricating medium, which, together with the coolant, constitutes what is known as wire drawing compound, is supplied to the dies in a constant stream during the drawing operation. A highly suitable wire drawing compound for use in wire drawing machines comprises a mixture of tallow, soap, rape seed oil and water. During the drawing of the wire, fine particles of copper are abraded from the wire by the dies and become mixed with the wire drawing compound. Since it is uneconomical to use the wire drawing compound one time and then discard it, the compound is used repeatedly. However, in order to provide a compound in which there is carried a minimum of copper dust, the wire drawing compound, between the periods when it is used, is transferred to storage tanks where a sludge is precipitated out of the compound. This sludge comprises the wire particles and some of the spent drawing compound which, because of its intimate mixing with the particles of copper, falls to the bottom of the storage tank and forms the sludge. It has been found that such a sludge contains an average of approximately 35% copper dust embedded in and intimately mixed with the spent elements of the wire drawing compound after the reusable compound has been drawn off.

It has been the practice, in the past, to collect this sludge and either discard it or treat it in various manners in an attempt to recover the copper from the sludge. A process which has been used to some extent is that disclosed in the patent to Raymond P. Lutz, No. 2,084,154, patented June 15, 1937, wherein a solvent for the fats and soap present in the sludge is utilized and wherein the sludge and solvent are treated in a centrifugal separator to remove the copper dust from the solvent.

The present invention, which is an alternate method of recovering copper dust from wire mill sludge, contemplates heating and stirring the sludge for a predetermined period and then allowing the sludge to settle for a predetermined period and then drawing off the surface liquid from the sludge. These steps are then repeated a second time and the copper dust residue, after the liquid residue and fats contained in the liquid have been decanted from the dust, is washed with a water solution of sodium salt of sulphonated fatty alcohol or its equivalent in water, whereupon the copper dust is permitted to settle out of the washing compound and, after the washing compound has been decanted, the dust may be heated and dried to produce a copper dust from which substantially all of the wire drawing compound has been removed.

In the specific embodiment of the invention, the sludge, which has been removed from a storage tank after the wire drawing compound from which the sludge has been precipitated has been drawn from the tanks, is placed in a steam heated tank and agitated or stirred for approximately one hour. After the sludge has been heated to approximately 200° F. and stirred for an hour, the sludge is permitted to settle for approximately two hours, whereupon the water and the fats floating thereon may be either decanted from the tank or pumped off and discarded. The remaining material may be reheated and again stirred for one hour at approximately 200° F. and then permitted to settle for approximately two hours, whereupon the liquid and fats supported therein, which will rise to the top of the tank, may again be decanted or pumped off. It has been found that at this stage of the process approximately 90% of the fats have been separated from the copper and it may be desirable to dispose of the copper in this condition. However, it has been found that copper containing even a small proportion of the fats from the compound may be made much more useful if the greater part of the remaining fats are removed from the copper and, accordingly, the process of the present invention contemplates filling the tank in which the copper dust is contained with hot water and agitating the material while adding a sodium salt of sulphonated fatty alcohol. A suitable commercial mixture which may be used is known as "Dupinol." After the tank filled with hot water and Dupinol has been agitated for approximately one hour, the mixture may be permitted to settle for two hours, whereupon the washing compound and fats washed from the copper dust and now contained in the washing compound may be decanted and discarded and the remaining material reheated and agitated again for approximately one-half an hour and then permitted to again settle. Since the Dupinol in water, after being agitated, will not support the copper dust, but will permit it to precipitate, the solution may be decanted shortly after the agitation stops, whereupon the remaining mixture in the tank may be heated and agitated until the copper dust in the tank is completely dry.

In following the process described in detail hereinbefore, it may be possible to stop the process after the repeated heating, stirring and settling of the sludge without washing the copper dust residue in Dupinol and a satisfactory commercial product will be produced. However, it has been found feasible to carry the process through the final washing stage since a much more valuable product is obtained in this manner, that is, copper dust which is practically free of any impurity.

What is claimed is:

1. The process of recovering copper dust from wire mill sludge which comprises heating and stirring the sludge for a predetermined time to partially separate the dust in the sludge from the fats, permitting the mixture to settle to effect a partial separation of the fats from the copper dust by gravity, removing the surface liquid and included fats, reheating and stirring the remaining mixture for a predetermined time, and permitting the mixture to settle again to separate more of the fats and liquid from the copper by precipitation of the copper and flotation of the fats.

2. The process of recovering copper dust from wire mill sludge which comprises heating and agitating the sludge for a predetermined interval, allowing the heated sludge to settle after the stirring period, decanting the surface liquid and included or supported parts of the sludge, and repeating the steps.

3. The process of recovering copper dust from wire mill sludge which comprises heating and agitating the sludge for a predetermined interval, allowing the heated sludge to settle after the stirring period, decanting the surface liquid and included or supported parts of the sludge, repeating these steps, and thereafter washing the copper dust residue with a water solution of a sodium salt of sulphonated fatty alcohol.

4. The process of recovering copper dust from wire mill sludge which comprises heating and stirring the sludge for a predetermined time to partially separate the dust in the sludge from the fats, permitting the mixture to settle to effect a partial separation of the fats from the copper dust by gravity, removing the surface liquid and included fats, reheating and stirring the remaining mixture for a predetermined time, permitting the mixture to settle again to separate more of the fats and liquid from the copper by precipitation of the copper and flotation of the fats, and treating the mixture with a surface active agent to emulsify the residual fats.

5. The process of recovering copper dust from wire mill sludge which comprises heating and stirring the sludge a plurality of times for a predetermined interval to partially separate the dust in the sludge from the fats, permitting the mixture to settle after each heating and stirring operation to effect a partial separation of the fats from the copper dust by gravity, and removing the surface liquid and included fats.

6. The process of recovering copper dust from wire mill sludge which comprises heating and stirring the sludge a plurality of times for a predetermined interval to partially separate the dust in the sludge from the fats, permitting the mixture to settle after each heating and stirring operation to effect a partial separation of the fats from the copper dust by gravity, removing the surface liquid and included fats, and treating the resultant mixture with a surface active agent to emulsify the residual fats.

7. The process of recovering copper dust from wire mill sludge which comprises heating and stirring the sludge a plurality of times to partially separate the dust in the sludge from the fats and permitting the mixture to settle after each heating and stirring operation to effect a partial separation of the fats from the copper dust by gravity, removing the surface liquids and included fats, washing the resultant mixture with a surface active agent to emulsify the residual fats, permitting the mixture to settle, then decanting the liquids, and heating and agitating the dust to remove the remaining liquid.

CLARENCE R. G. STEWART.